United States Patent
Leung et al.

(10) Patent No.: US 7,574,217 B1
(45) Date of Patent: Aug. 11, 2009

(54) METHOD FOR DYNAMIC CONFIGURATION OF A MOBILE ACCESS POINT

(75) Inventors: Patrick Pak-Chiu Leung, Saratoga, CA (US); Son Hoanh Phuoc Le, San Jose, CA (US); Jicheng Ye, Cupertino, CA (US); Teh-Wei David Chen, Saratoga, CA (US); Mark Min He, San Jose, CA (US); James G. Rethmeyer, Newark, CA (US); John F. Wakerly, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 345 days.

(21) Appl. No.: 10/654,309

(22) Filed: Sep. 2, 2003

(51) Int. Cl.
*H04B 7/00* (2006.01)

(52) U.S. Cl. .................... 455/456.1; 455/560
(58) Field of Classification Search ............. 455/456.1, 455/427, 428, 433, 445, 456.5, 456.6, 560
See application file for complete search history.

(56) References Cited

U.S. PATENT DOCUMENTS

| | | | |
|---|---|---|---|
| 6,181,931 B1 * | 1/2001 | Alldredge | 455/427 |
| 7,046,657 B2 * | 5/2006 | Harrington et al. | 370/350 |
| 2003/0064731 A1 * | 4/2003 | Angelo et al. | 455/456 |
| 2003/0119527 A1 * | 6/2003 | Labun et al. | 455/456 |
| 2003/0235163 A1 * | 12/2003 | Montz et al. | 370/331 |
| 2004/0116140 A1 * | 6/2004 | Babbar et al. | 455/517 |
| 2004/0192352 A1 * | 9/2004 | Vallstrom et al. | 455/456.6 |

OTHER PUBLICATIONS

The Institute of Electrical and Electronics Engineers; IEEE Standard 802.11d-2001; "IEEE Standard for Information technology, Telecommunications and information exchange between systems, Local and metropolitan area networks, Specific requirements, Part 11: Wireless LAN Medium Access Control (MAC) and Physical Layer (PHY) specifications; Amendment 3: Specification for operation in additional regulatory domains"; pp. iii-viii and 1-26; Jul. 13, 2001.

* cited by examiner

*Primary Examiner*—Sam Bhattacharya
(74) *Attorney, Agent, or Firm*—Stolowitz Ford Cowger LLP

(57) ABSTRACT

A method for dynamic configuration of a mobile access point. A position of the mobile access point is determined based on a position determination system. A region is identified based on position. Configuration information associated with an application of the mobile access point is automatically updated based on the region.

40 Claims, 4 Drawing Sheets

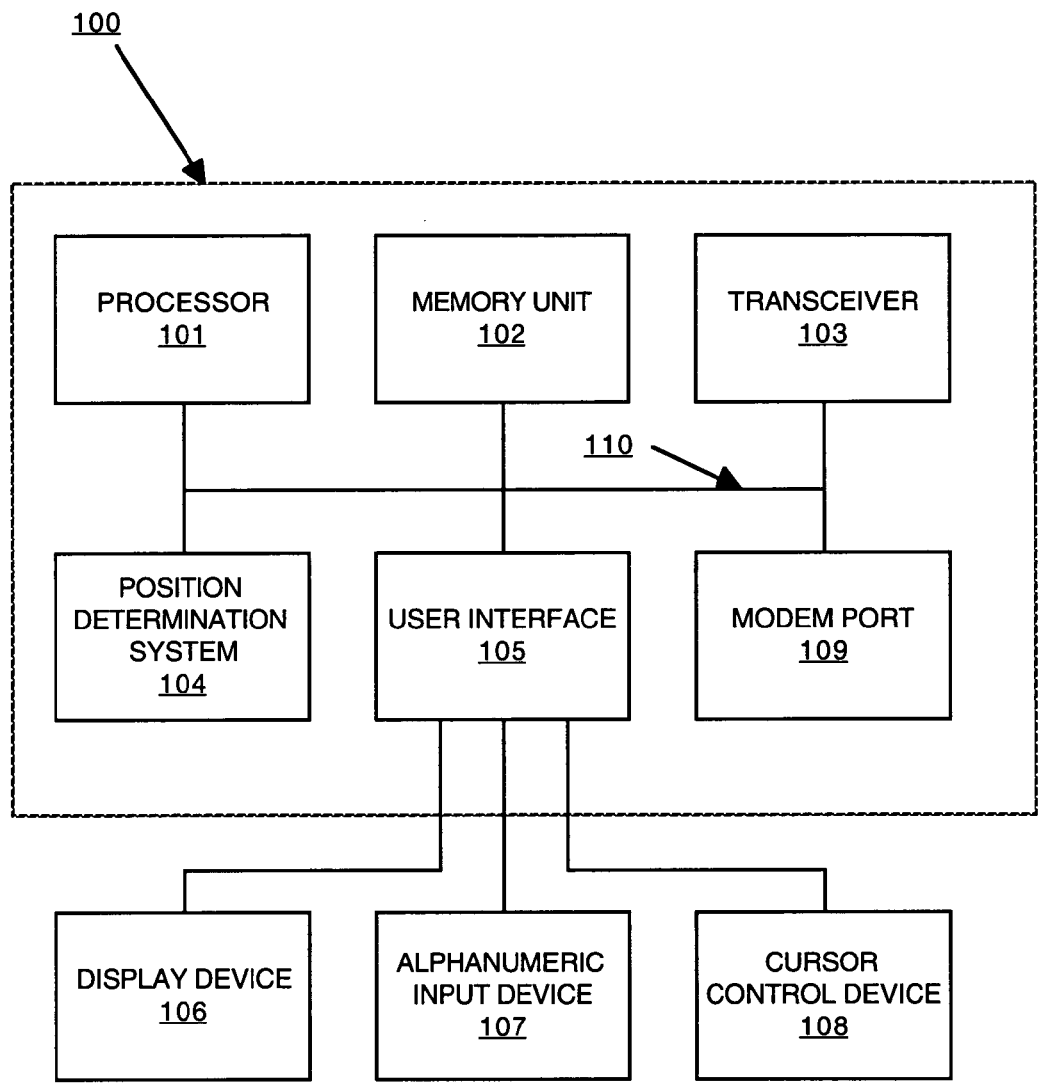

Figure 2B
250
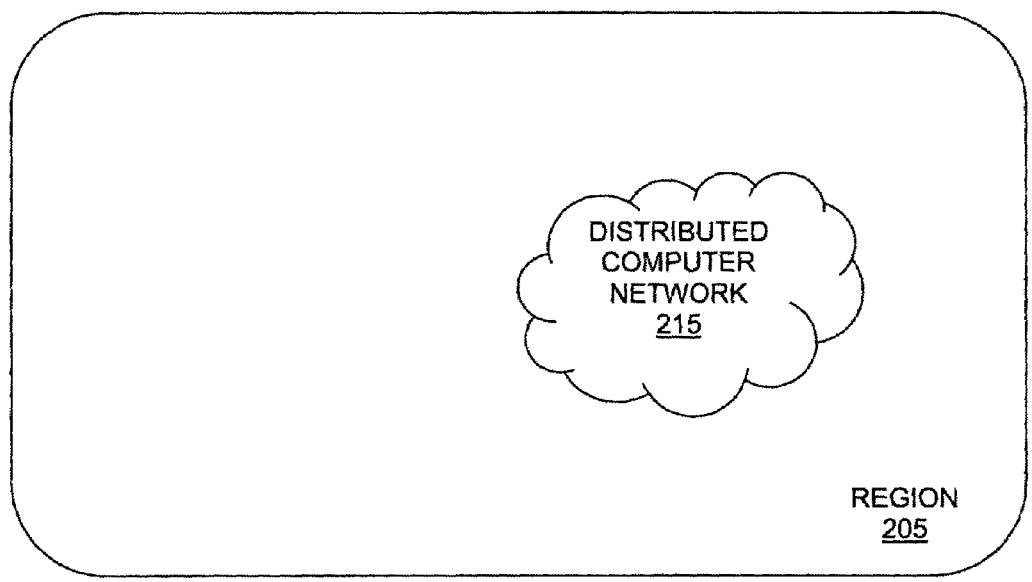
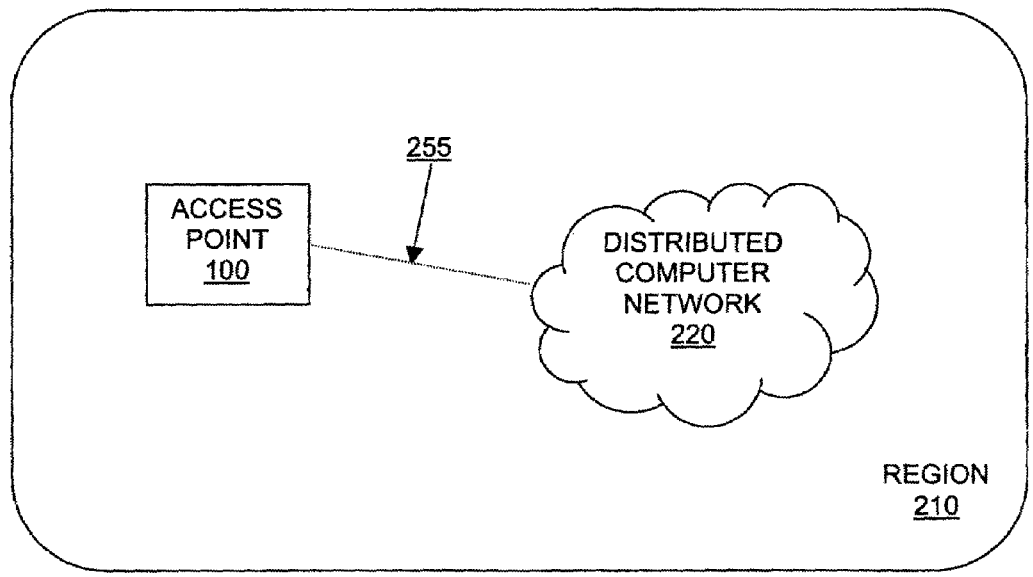

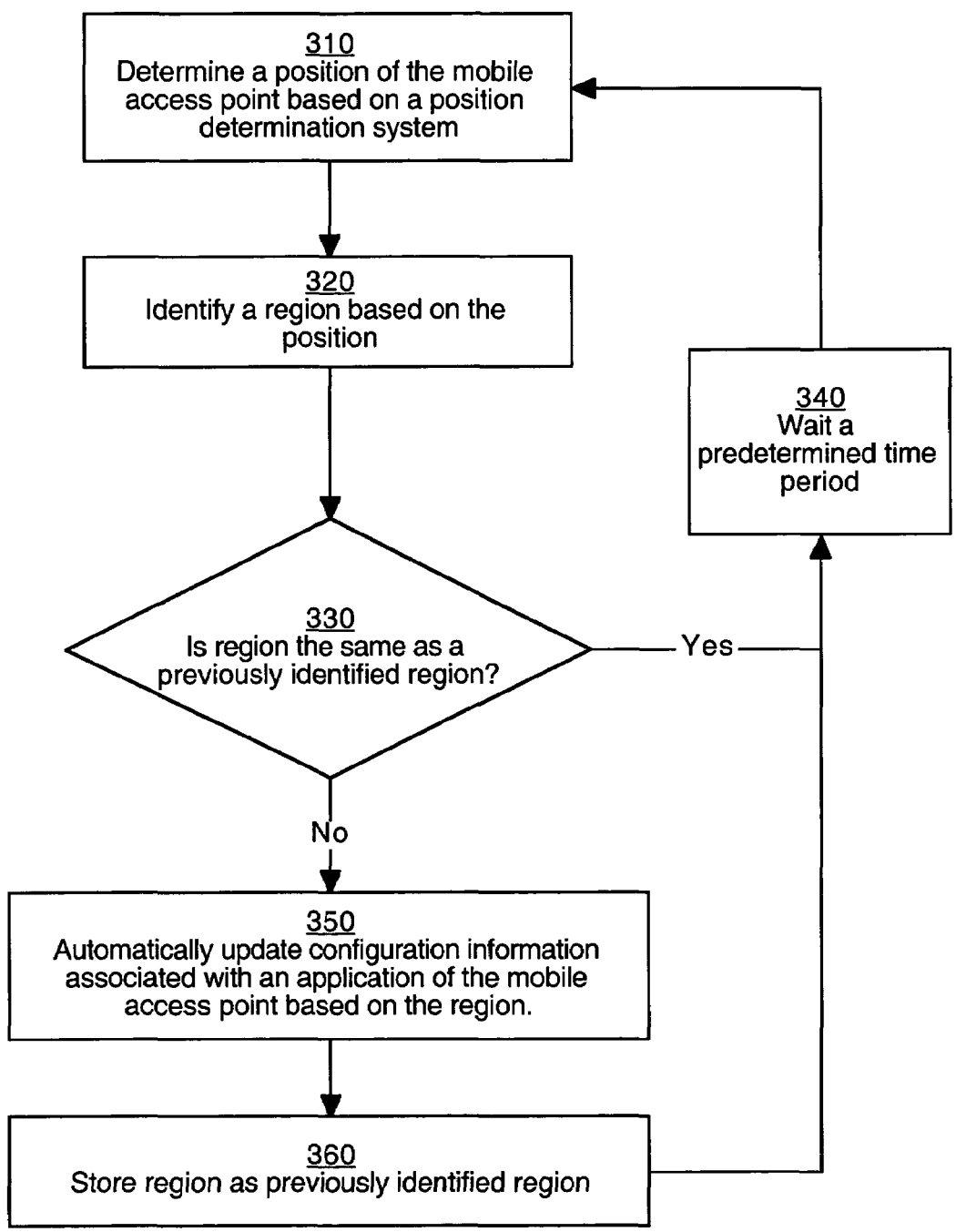

US 7,574,217 B1

METHOD FOR DYNAMIC CONFIGURATION OF A MOBILE ACCESS POINT

FIELD OF INVENTION

The present invention relates to the field of computer network communications. Specifically, the present invention relates to a method for dynamic configuration of a mobile access point.

BACKGROUND OF THE INVENTION

In a wireless local area network (WLAN), an access point is a station that transmits and receives data. An access point serves as a point of connection between wireless devices and devices within a fixed wired network. Access points can also be used to allow wireless devices to communicate to each other. Each access point can serve multiple wireless devices within a defined network area. As wireless devices move beyond the range of one access point, they are automatically handed over to another access point.

Currently, access points have a wired connection to a fixed wired network. This wired connection is typically implemented using LAN technologies (e.g., Ethernet, Tokenring, etc.), or other wired network technologies. In particular, access points are typically themselves fixed in position. For example, access points may be placed at various fixed locations throughout a business facility.

Due to the fact that different countries (or regions) often have different regulations governing wireless communications, wireless equipment typically cannot be used in countries other than the one for which the wireless equipment was manufactured. For example, regulations governing wireless communications typically specify particular configurations for radio frequency usage, maximum conducted power output for the equipment, and maximum antenna gain for conducted power.

Currently, access points are preconfigured with the appropriate country-specific configurations at manufacturing. Furthermore, the wireless communications configurations of an access point are typically not modifiable by a user. Therefore, access points can only be used in a country or region for which it was manufactured.

SUMMARY OF THE INVENTION

Accordingly, a need exists for an access point that can be used in different countries or regions. A need also exists for an access point that is mobile for use in a plurality of different countries or regions. Furthermore, a need also exists for an access point that can automatically update configuration information based on a particular country or region.

In one embodiment, the invention provides a method for dynamic configuration of a mobile access point. In one embodiment, the mobile access point comprises a router. A position of the mobile access point is determined based on a position determination system. In one embodiment, determining the position is performed periodically according to a predetermined time period. In one embodiment, the position determination system is a global positioning system (GPS) system.

A region is identified based on position. Configuration information associated with an application of the mobile access point is automatically updated based on the region. In one embodiment, the application operates at a physical layer of a protocol stack of the mobile access point. In one embodiment, the application is a radio providing communication over the wireless connection.

In one embodiment, the configuration information comprises a radio frequency, a maximum conducted power output, and a maximum antenna gain. In one embodiment, the mobile access point communicates by a wireless connection to a distributed computer network in the region using mobile Internet protocol (IP). In another embodiment, the application operates at an application layer of a protocol stack of the mobile access point.

In another embodiment, the invention provides a mobile access point comprising a bus, a transceiver coupled to the bus, a memory unit coupled to the bus, a position determination system coupled to the bus, and a processor coupled to the bus. In one embodiment, the mobile access point is operable to provide routing capability for routing data packets.

The transceiver is communicatively coupled to a distributed computer network over a wireless connection. In one embodiment, the mobile access point is communicatively coupled to the distributed computer network using Mobile IP.

The memory unit comprises configuration information associated with the transceiver for a plurality of regions. In one embodiment, the configuration information comprises a radio frequency, a maximum conducted power output, and a maximum antenna gain. In one embodiment, the memory unit further comprises second configuration information of an application for a second plurality of regions. In one embodiment, the application operates at an application layer of a protocol stack of the mobile access point.

The position determination system is for identifying a geographic position of the mobile access point. In one embodiment, the position determination system is operable to identify the geographic position periodically according to a predetermined time period. In one embodiment, the position determination system is a global positioning system (GPS) system.

The processor is for updating the configuration information associated with the transceiver in response to the geographic position. In one embodiment, the processor is operable to update the second configuration information in response to the geographic position.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a block diagram of a mobile access point in accordance with an embodiment of the present invention.

FIG. 2B is a block diagram illustrating mobile access point located in a second region in accordance with an embodiment of the present invention.

FIG. 3 is a flow chart diagram illustrating a process of dynamic configuration of a mobile access point in accordance with an embodiment of the present invention.

DETAILED DESCRIPTION

Figure 2A:
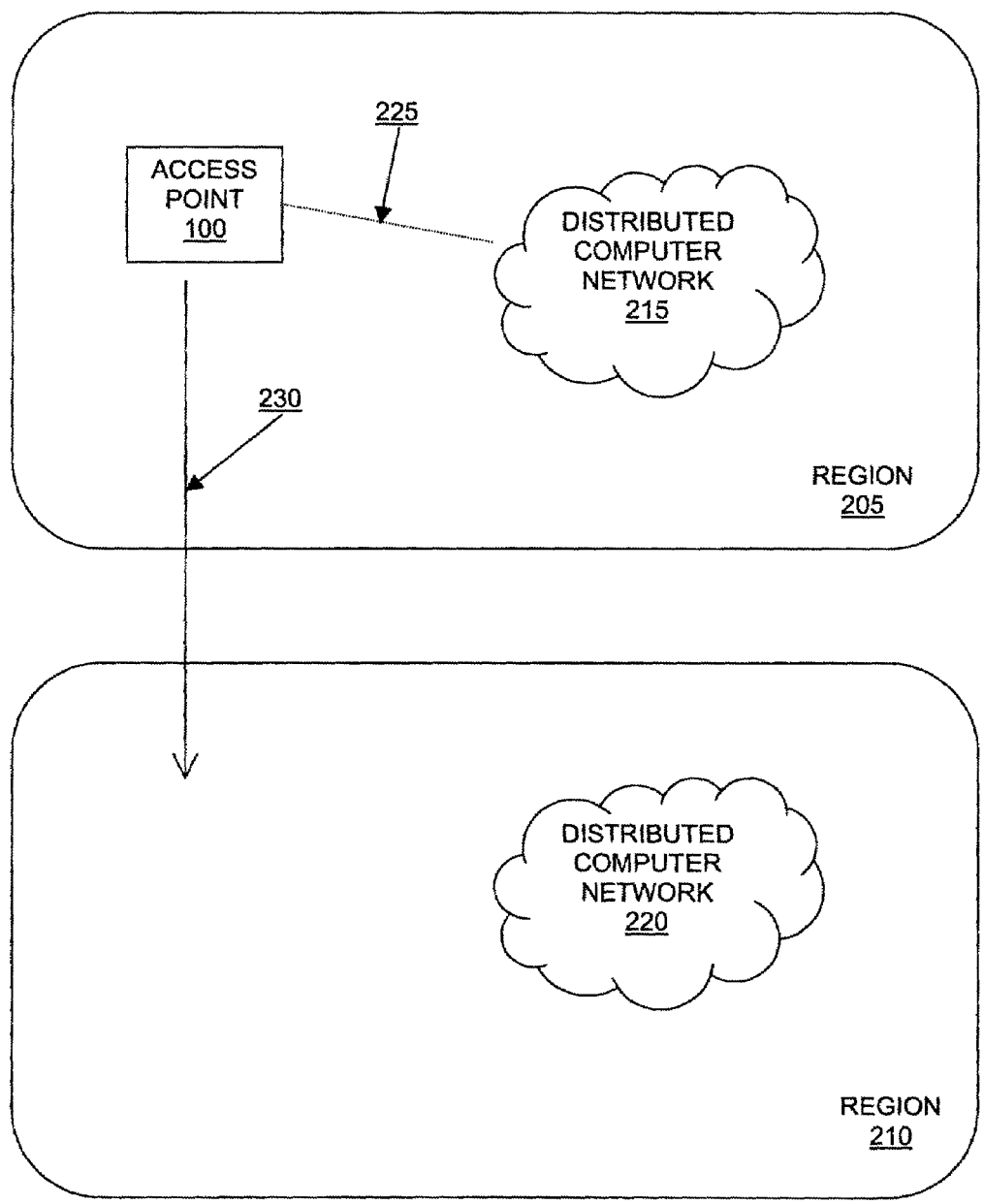
FIG. 2A is a block diagram illustrating mobile access point located in a first region in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

A mobile access point and a method for dynamic configuration of a mobile access point are presented. Embodiments of the present invention provide an access point that can be used in different countries or regions. Furthermore, embodiments of the present invention provide an access point that is mobile for use in a plurality of different countries or regions. Also, embodiments of the present invention provide an access point that can automatically update configuration information based on a particular country or region.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining", "identifying", "updating", or the like, refer to the actions and processes of a computer system, or similar electronic computing device, such as an access point. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Refer now to FIG. 1 which illustrates a mobile access point 100 in accordance with one embodiments of the present invention. Mobile access point 100 comprises bus 110 for communicating information, processor 101 coupled with bus 110 for processing information and instructions, memory unit 102 coupled with bus 110 for storing information and instructions for processor 101, transceiver 103 for communicating information over a wireless connection, and position determination system 104 for identifying a geographic position of mobile access point 100. In one embodiment, mobile access point 100 further comprises modem port 109 for updating information over a telephone connection.

Bus 110 allows communication as required among the other elements of mobile access point 100 shown in FIG. 1. As understood by those skilled in the art, a "bus" may comprise a shared set of wires or electrical signal paths to which other elements connect. However, as also understood by those skilled in the art, required communication paths may also be provided by other structures, such as individual point-to-point connections from each element to a switch, dedicated connections for each for each pair of elements that must communicate with each other, or any combination of dedicated and shared paths. Therefore, it should be appreciated that the term "bus" refers to any structure that provides the communications paths required by the methods and apparatus described below.

Mobile access point 100 operates as a base station for facilitating wireless communications between a distributed computer network and wireless client devices. In one embodiment, mobile access point 100 implements the 802.11 family of specifications for providing wireless communications. It should be appreciated that mobile access point 100 may implement any 802.11 standard (e.g., 802.11a, 802.11b, or 802.11g), as well as any other standard or proprietary wireless communications method. In one embodiment, mobile access point 100 is configured to be communicatively coupled to a distributed computer network over a wireless connection, as described above. However, it should be appreciated that mobile access point 100 may also be configured for communicative coupling to a distributed computer network over a wired connection.

Mobile access point 100 implements a protocol stack to facilitate the hierarchy of protocols used by the devices and applications of mobile access point 100 for communicating information. In one embodiment, the Open Systems Interconnection (OSI) protocol stack is implemented. It should be appreciated that any protocol stack, such as TCP/IP or ATM, may also be implemented. In general, the protocol stack has an application layer, a transport layer, a network layer and a physical layer.

Memory unit 102 has stored therein configuration information associated with transceiver 103 for a plurality of regions. Memory unit 102 also has stored therein information defining a plurality of regions based on geographic coordinates. In one embodiment, the plurality of regions identifies country coordinates. However, it should be appreciated that the regions may identify any geographic area, such as a greater metropolitan area or a group of countries, and is not limited to country coordinates. In one embodiment, the plurality of regions are defined at the time of manufacturing. In another embodiment, the plurality of regions may be user-defined. In yet another embodiment, definitions of the plurality of regions may be updated via the distributed computer network, as initiated by the user, the manufacturer, or other entity responsible for management of the mobile access point. Such definition updates also may be initiated by the mobile access point itself, for example, as part of a periodic self-maintenance procedure or in response to events such as determining that there is no region in its current configuration corresponding to its current geographic coordinates. Such updates via the distributed computer network may be made using a wired connection, a wireless connection using "least-common-denominator" or default configuration information, or an alternate communication port such as a modem port 109. Furthermore, it should be appreciated that different applications of mobile access point 100 may have a different defined set of plurality of regions. For example, a plurality of regions may be defined for associating particular configuration information with transceiver 103 (e.g., North America or Europe) and a second plurality of regions may be defined for associating particular configuration information with user interface 105 (e.g., France, Spain, Germany).

In one embodiment, memory 102 also has stored therein the identity of a previously identified region. The previously identified region may be stored at the time of manufacture, or may be determined based on a geographic position as determined by position determination system 104. In one embodiment, whenever it is determined that mobile access point 100 has changed regions, the new region is stored as the previously identified region. Memory unit 102 may be random access (volatile) memory (RAM), read-only (non-volatile) memory (ROM), or a combination of both volatile and non-volatile memory.

Transceiver 103 is operable to be communicatively coupled to a distributed computer network over a wireless connection. In one embodiment, mobile access point 100 is communicatively coupled to a distributed computer network using Mobile Internet protocol (IP). Mobile IP is an Internet Engineering Task Force (IETF) standard communications protocol that is designed to allow mobile device users to move from one network to another while maintaining their permanent IP address, and is described in detail in IETF Request for Comments (RFC) 2002. However, it should be appreciated that Mobile IP may implement any number of other IP-based protocols. Furthermore, it should be appreciated that mobile access point 100 may implement any mobility-related protocol for facilitating communications in a mobile environment, and is not limited to Mobile IP. In one embodiment, transceiver 103 is a radio device. It should be appreciated that transceiver 103 may be any device for transmitting and receiving data, as well as separate transmitter and receiver devices. In general, transceiver 103 operates at the physical layer of the protocol stack.

Position determination system 104 is operable to identify a geographic position of mobile access point 100. In one embodiment, position determination system 104 determines the geographic position based on a system of satellites orbiting the Earth. In one embodiment, position determination system 104 is a global positioning system (GPS). However, it should be appreciated that any system for determining a geographic position may be used.

In one embodiment, mobile access point 100 also comprises user interface 105. User interface 105 provides a user with the ability to configure and manage the operations of mobile access point 100. In one embodiment, user interface 105 is a software application that communicates information and command selections to processor 101. Devices can be coupled to user interface 105 for displaying or receiving information. User interface 105 operates within the application layer of the protocol stack. By interacting with user interface 105, a user is able to access the management settings and information of mobile access point 100. For example, a user may adjust security settings or obtain performance statistics through user interface 105.

Display device 106 is for displaying information to a user. Display device 106 utilized with mobile access point 100 may be a liquid crystal display device, cathode ray tube, or other display device suitable for creating graphic images and alphanumeric characters recognizable to the user. Alphanumeric input device 107 (e.g., a keyboard) including alphanumeric and function keys or cursor control device 108 (e.g., a mouse) may be communicate information and command selections through user interface 105 to processor 101.

In one embodiment, processor 101 is operable to identify a region as stored in memory unit 102 based on the geographic position as determined by position determination system 104. In one embodiment, processor 101 identifies a region by comparing the geographic position to geographic coordinates defining a region as stored in memory unit 102. The region is then compared to a previously identified region. If the region is different than the previously identified region, processor 101 is operable to update the configuration information associated with applications of mobile access point 101 in response to the geographic position. It should be appreciated that the configuration information for any application operating at any layer of the protocol stack may be updated. In one embodiment, the configuration information for transceiver 103 operating at the physical level of the protocol stack may be updated. In another embodiment, the configuration information for user interface 105 operating at the application level of the protocol stack may be updated.

In response to mobile access point 100 being located in a particular region, configuration information stored in memory unit 102 may be updated. FIGS. 2A and 2B illustrate two regions (e.g., region 205 and region 210) with which mobile access point 100 may be communicatively coupled. As described above, depending on the region within which mobile access point 100 is located and the particular application being used, configuration information may be updated.

FIG. 2A is a block diagram 200 illustrating mobile access point 100 located in region 205 in accordance with an embodiment of the present invention. Mobile access point 100 is communicatively coupled to distributed computer network 215 over connection 225. In one embodiment, connection 225 is a wireless connection. In another embodiment, connection 225 is a wired connection. Distributed computer network 215, and likewise distributed computer network 220, may include well-known network technologies. For example, distributed computer network 215 and distributed computer network 220 can be implemented using LAN technologies (e.g., Ethernet, Tokenring, etc.), the Internet, or other wired or wireless network technologies.

Stored within memory (e.g., memory unit 102 of FIG. 2) of mobile access point 100, is configuration information for a plurality of regions for applications of mobile access point 100. For example, consider the operation of a transceiver (e.g., transceiver 103 of FIG. 1) of mobile access point 100. Region 205 may be a country or a group of countries within which mobile access point 100 is located. Within region 205, wireless communications are subject to particular wireless communication configuration. In one embodiment, the wireless communication configuration for region 205 includes specific regarding a radio frequency, a maximum conducted power output, and a maximum antenna gain. Accordingly, a radio frequency, a maximum conducted power output, and a maximum antenna gain for region 205 are stored in memory of mobile access point 100. While mobile access point 100 remains in region 205, the configuration information for region 205 associated with the transceiver is used to operate the transceiver.

In another example, consider the operation of a user interface (e.g., user interface 105 of FIG. 1) of mobile access point 100. Within region 205, users typically speak a particular language. Accordingly, a language for region 205 is stored in the configuration information associated with the user interface of mobile access point 100. While mobile access point 100 remains in region 205, the user interface is operable to present and receive information in the language identified in the configuration information.

Similarly, it should be appreciated that the memory of mobile access point 100 may have stored therein configuration information associated with a number of other applications of mobile access point 100 for a plurality of regions. For example, configuration information may apply to selection of preferred routing protocols, service providers, management protocols, local "help desk" telephone numbers displayed to the user, and management and service information and sites for communicating with a home network. In the last example, the configuration information may include a network address (e.g., IP address and/or hostname) identifying one or more region-specific entities which may responsible for managing the mobile access point, including providing region definition, software, security, and other updates, or telephone numbers that can be dialed on modem port 109 in order to access such region-specific entities. It should be appreciated that a particular region within which mobile access point 100 is located may affect applications operating at all layers of the protocol stack.

With reference to FIG. 2A, arrow 230 indicates the movement of mobile access point 100 out of region 205 into region 210. FIG. 2B is a block diagram 250 illustrating mobile access point 100 located in region 210 in accordance with an embodiment of the present invention. Mobile access point 100 is communicatively coupled to distributed computer network 220 over connection 255. In one embodiment, connection 255 is a wireless connection. In another embodiment, connection 255 is a wired connection.

As described above, stored within memory of mobile access point 100, is configuration information for a plurality of regions for applications of mobile access point 100. Continuing an example from above, consider the operation of a transceiver (e.g., transceiver 103 of FIG. 1) of mobile access point 100. Region 210 may be a country or a group of countries within which mobile access point 100 is located. Region 210 requires devices providing wireless communications to have a different wireless communication configuration than devices in region 205. Accordingly, a radio frequency, a maximum conducted power output, and a maximum antenna gain for region 210 are stored in memory of mobile access point 100. When mobile access point 100 enters region 210, the configuration information used to operate the transceiver is updated with the configuration information associated with region 210.

Continuing another example from above, consider the operation of a user interface of mobile access point 100. Within region 210, users typically speak a language different than users located in region 205. Accordingly, a language for region 210 is stored in the configuration information associated with the user interface of mobile access point 100. When mobile access point 100 enters region 210, the configuration information used to operate the user interface is updated with the configuration information associated with region 210.

It should be appreciated that different applications of mobile access point 100 can have a different defined plurality of regions and associated configuration information. For example, wireless communications typically are governed in large regions. North America uses one wireless communications configuration, and is not governed by individual countries. Similarly, most countries in Europe use the same wireless communication configuration. However, languages may vary from country to country. For example, while the wireless communication configuration used in both Mexico and the United States may be the same for operating a transceiver, the language for interacting with a user interface may be different. Therefore, different applications may have different defined regions. Furthermore, it should be appreciated that a region may be defined as smaller than a country, depending on the particular associated application.

FIG. 3 is a flowchart illustrating a process 300 of dynamic configuration of a mobile access point in accordance with an embodiment of the present invention. In one embodiment, process 300 is carried out by processors and electrical components (e.g., mobile access point 100 of FIG. 1) under the control of computer readable and computer executable instructions. Although specific steps are disclosed in process 300, such steps are exemplary. That is, the embodiments of the present invention are well suited to performing various other steps or variations of the steps recited in FIG. 3.

At step 310, a position of the mobile access point is determined based on a position determination system. In one embodiment, the position determination system is a GPS device. However, it should be appreciated that the position determination system can be any system for determining a geographic position.

At step 320, a region is identified based on the position. In one embodiment, memory (e.g., memory unit 102 of FIG. 1) includes information defining a plurality of regions. By determining which region of a plurality of regions the position is located in, the region may be identified. As described above, the region may define any geographic area, such as a country or a group of countries. The information may be downloaded via a wired connection, by using a default or least-common-denominator wireless connection, over a modem connection (e.g., modem port 109 of FIG. 1) to a pre-configured or identified phone number. In another embodiment, a user can update the information manually.

At step 330, it is determined whether the region determined at step 320 is the same as a previously identified region. A previously identified region may be stored in memory of the mobile access point. By determining whether the region determined at step 320 is the same as the previously identified region, it can be determined whether the mobile access point has moved into a new region.

If it is determined that the region determined at step 320 is the same as the previously identified region, process 300 proceeds to step 340. At step 340, process 300 waits a predetermined time period. In one embodiment, the predetermined time period is preset in the mobile access point at manufacturing. In another embodiment, the predetermined time period is user-defined. Process 300 then returns to step 310.

Alternatively, if it is determined that the region determined at step 320 is not the same as the previously identified region, process 300 proceeds to step 350. At step 350, the configuration information associated with an application of the mobile access point is updated based on the region. In one embodiment, the application operates at a physical layer of a protocol stack of the mobile access point, such as a transceiver for providing communication over said wireless connection. In another embodiment, the application operates at an application layer of a protocol stack of the mobile access point, such as a user interface. It should be appreciated that the application may operate at any layer of the protocol stack of the mobile access point.

At step 360, the region is stored as the previously identified region. Storing the region as the previously identified region allows for determining whether the mobile access point moves into another region. Process 300 then proceeds to step 340. At step 340, process 300 waits a predetermined time period. In one embodiment, the predetermined time period is preset in the mobile access point at manufacturing. In another embodiment, the predetermined time period is user-defined. Process 300 then returns to step 310.

Embodiments of the present invention provide a dynamically configurable mobile access point that is operable to configure itself to appropriate modes of operation automatically based in its location without requiring user interaction. An embedded position determination system, such as a GPS device, allows the mobile access point to determine its geographic position. In response to determining the region within which it currently resides, the mobile access point may automatically update appropriate configuration information. As such, the mobile access point of the present invention may be used in regions or countries with various application configurations.

Various embodiments of the present invention, a method for dynamic configuration of a mobile access point, are thus described. While the present invention has been described in particular embodiments, it should be appreciated that the present invention should not be construed as limited by such embodiments, but rather construed according to the below claims.

What is claimed is:

1. A method for dynamic configuration of a mobile access point comprising:
   determining a position of said mobile access point, wherein said mobile access point provides a point of connection for wireless communications between a distributed computer network and a wireless client device;
   identifying a region comprising said position of said mobile access point;
   comparing said region with a previous position of said mobile access point to determine when said mobile access point has been moved to said region from said previous position, wherein said previous position is associated with a different region;
   automatically updating configuration information associated with an application of said mobile access point based on said region, wherein said configuration information enables transmission of a wireless communication from said wireless client device to said mobile access point within said region, and wherein said configuration information is different than a previous configuration associated with said different region; and
   routing data packets comprising said wireless communication, wherein said mobile access point routes said data packets between said wireless client device and said distributed computer network.

2. The method as recited in claim 1 wherein said mobile access point comprises a router.

3. The method as recited in claim 1 wherein said mobile access point communicates by a wireless connection to said distributed computer network in said region using Mobile Internet protocol (IP).

4. The method as recited in claim 1 wherein said mobile access point is configured to use an Open Systems Interconnection (OSI) network layer to route said data packets.

5. The method as recited in claim 4 wherein said application is a transceiver providing communication over a wireless connection.

6. The method as recited in claim 5 wherein said configuration information comprises a radio frequency, a maximum conducted power output, or a maximum antenna gain.

7. The method as recited in claim 1 wherein said determining said position is performed periodically according to a predetermined time period.

8. The method as recited in claim 1 wherein said position of said mobile access point is determined by a global positioning system (GPS) system.

9. The method as recited in claim 1 wherein said application operates at an application layer of a protocol stack of said mobile access point.

10. The method as recited in claim 1 wherein said configuration information comprises transmission configuration data and a selected user interface language, and wherein said transmission configuration data and said selected user interface language are separately configurable for said region.

11. A mobile access point comprising:
    a processor for updating configuration information in response to a geographic position of said mobile access point, wherein said configuration information includes an updated radio frequency for transmitting wireless communications between a computer network and a wireless client device in communication with said mobile access point;
    a transceiver coupled to said processor, wherein said transceiver is associated with said configuration information and communicatively coupled to said computer network over a wireless connection, wherein said mobile access point is operable to provide a point of connection for wireless communications between said computer network and said wireless client device over said wireless connection, and wherein said mobile access point is further operable to provide routing capability for routing data packets from said wireless client device to said computer network;
    a memory unit coupled to said processor, wherein said memory unit stores said configuration information, and wherein said configuration information is associated with a plurality of regions; and
    a position determination system coupled to said processor, wherein said position determination system is operable to identify said geographic region from said plurality of regions, and wherein said updated radio frequency is selected corresponding to said identified geographic position of said mobile access point.

12. The mobile access point as recited in claim 11 wherein said mobile access point comprises a router configured to route said data packets using an Open Systems Interconnection (OSI) network layer.

13. The mobile access point as recited in claim 11 wherein said mobile access point is communicatively coupled to a distributed computer network using Mobile Internet protocol (IP).

14. The mobile access point as recited in claim 11 wherein said configuration information further comprises a maximum conducted power output, or a maximum antenna gain.

15. The mobile access point as recited in claim 11 wherein said position determination system is operable to identify said geographic position periodically according to a predetermined time period.

16. The mobile access point as recited in claim 11 wherein said memory unit further comprises second configuration information of an application for a second plurality of regions.

17. The mobile access point as recited in claim 16 wherein said processor is operable to update said second configuration information in response to said geographic position.

18. The mobile access point as recited in claim 11 wherein said processor is configured to compare said geographic region with a previous position of said mobile access point to determine when said mobile access point has been moved to said geographic region.

19. The mobile access point as recited in claim 18 wherein said configuration information is different than a previous configuration associated with said previous position.

20. The mobile access point as recited in claim 11 wherein said configuration information comprises transmission configuration data and a selected user interface language, and wherein said transmission configuration data and said selected user interface language are separately configurable for said region.

21. A computer-readable medium having computer-readable program code embodied therein for causing a computer system to perform a method of dynamic configuration of a mobile access point, wherein said mobile access point is operable to provide a point of connection for wireless communications between a computer network and a wireless client device, said method comprising:

determining a position of said mobile access point;

comparing said position with a previous position of said mobile access point to determine when said mobile access point has been moved;

identifying a region based on said position;

automatically updating configuration information associated with an application of said mobile access point based on said region, wherein said configuration information enables transmission of wireless communications from said wireless client device to said mobile access point within said region, and wherein said configuration information is different than a previous configuration associated with a previous region comprising said previous position; and routing data packets comprising said wireless communications received by said mobile access point from said wireless client device, wherein said data packets are routed to said computer network.

22. The computer-readable medium as recited in claim 21 wherein said mobile access point comprises a router.

23. The computer-readable medium as recited in claim 21 wherein said mobile access point communicates by a wireless connection to a distributed computer network in said region using Mobile Internet protocol (IP).

24. The computer-readable medium as recited in claim 21 wherein said mobile access point operates at an Open Systems Interconnection (OSI) network layer to route said data packets.

25. The computer-readable medium as recited in claim 24 wherein said application is a radio providing communication over said wireless connection.

26. The computer-readable medium as recited in claim 25 wherein said configuration information comprises a radio frequency, a maximum conducted power output, or a maximum antenna gain.

27. The computer-readable medium as recited in claim 21 wherein said determining said position is performed periodically according to a predetermined time period.

28. The computer-readable medium as recited in claim 21, said method further comprising transmitting said wireless communications from said mobile access point to said computer network.

29. The computer-readable medium as recited in claim 21 wherein said application operates at an application layer of a protocol stack of said mobile access point.

30. The computer-readable medium as recited in claim 21 wherein said configuration information comprises transmission configuration data and a selected user interface language, wherein said transmission configuration data and said selected user interface language are individually configured for said region.

31. A system for dynamic configuration of a mobile access point, wherein said mobile access point provides a point of connection for wireless communications between a distributed computer network and a wireless client device, said system comprising:

means for determining a position of said mobile access point, wherein said position is associated with a region;

means for identifying a change in position of said mobile access point based on said position; and means for automatically updating configuration information associated with an application of said mobile access point based on said change in position, wherein said configuration information includes a selected radio frequency for transmitting a wireless communication from said wireless client device to said mobile access point within said region; and means for routing data packets comprising said wireless communication received by said mobile access point from said wireless client device, wherein said data packets are routed to said distributed computer network.

32. The system as recited in claim 31 wherein said mobile access point comprises a router.

33. The system as recited in claim 31 further comprising means for comparing said position with a previous position of said mobile access point to determine if said mobile access point has been moved to said.

34. The system as recited in claim 31 wherein said mobile access point is configured to use an Open Systems Interconnection (OSI) network layer to route said data packets.

35. The system as recited in claim 34 wherein said application is a transceiver providing communication over said wireless connection.

36. The system as recited in claim 35 wherein said configuration information comprises a radio frequency, a maximum conducted power output, or a maximum antenna gain.

37. The system as recited in claim 33 wherein said configuration information is different than a previous configuration associated with said previous position.

38. The system as recited in claim 31 wherein said means for determining a position of said mobile access point comprises a global positioning system (GPS) system.

39. The system as recited in claim 31 wherein said application operates at an application layer of a protocol stack of said mobile access point.

40. The system as recited in claim 31 wherein said configuration information comprises transmission configuration data and a selected user interface language, wherein said transmission configuration data and said selected user interface language are individually configured for said region.

\* \* \* \* \*

UNITED STATES PATENT AND TRADEMARK OFFICE
CERTIFICATE OF CORRECTION

| | | |
|---|---|---|
| PATENT NO. | : 7,574,217 B1 | Page 1 of 1 |
| APPLICATION NO. | : 10/654309 | |
| DATED | : August 11, 2009 | |
| INVENTOR(S) | : Leung et al. | |

It is certified that error appears in the above-identified patent and that said Letters Patent is hereby corrected as shown below:

At column 12, line 29, please replace "moved to said" with --moved to said position--.

Signed and Sealed this

Tenth Day of November, 2009

David J. Kappos
*Director of the United States Patent and Trademark Office*